United States Patent [19]

Cyrkiewicz et al.

[11] Patent Number: 5,683,616
[45] Date of Patent: Nov. 4, 1997

[54] PROCESS FOR PREPARING CERAMIC-LIKE MATERIALS AND THE CERAMIC-LIKE MATERIALS

[76] Inventors: Marceli Cyrkiewicz, ul. Narutowicza, Lodz, Poland, PL-90-146; Erwin Herling, 817 Fifth Ave., New York, N.Y. 10021; Jacek Kleszczewski, ul. Falista 157, Lodz, Poland, PL-94 115

[21] Appl. No.: 564,204
[22] PCT Filed: Aug. 12, 1993
[86] PCT No.: PCT/PL93/00012
§ 371 Date: Dec. 18, 1995
§ 102(e) Date: Dec. 18, 1995
[87] PCT Pub. No.: WO95/00583
PCT Pub. Date: Jan. 5, 1995

[30] Foreign Application Priority Data

Jun. 25, 1993 [PL] Poland .................. 299472

[51] Int. Cl.$^6$ .................. C08K 3/00; C08L 67/06
[52] U.S. Cl. .................. 252/62.54; 252/62.56; 252/62.51 R; 252/478; 524/5; 524/423; 524/788; 106/786; 106/779; 106/772; 106/782; 106/640; 501/74
[58] Field of Search .................. 106/786, 778, 106/772, 782, 680; 252/62.56, 62.54, 62.51 R, 478; 524/5, 423, 788; 501/74

[56] References Cited

U.S. PATENT DOCUMENTS

| | | | |
|---|---|---|---|
| 3,873,492 | 3/1975 | Takehisa et al. | 260/42.14 |
| 4,153,470 | 5/1979 | Stahl et al. | 106/680 |
| 5,344,490 | 9/1994 | Roosen et al. | 106/778 |

FOREIGN PATENT DOCUMENTS

| | | | |
|---|---|---|---|
| 283240 | 7/1981 | Poland . | |
| 1541655 | 3/1979 | United Kingdom . | |
| 2105640 | 3/1981 | United Kingdom | 106/778 |
| 95/00589 | 1/1995 | WIPO . | |
| 95/28440 | 10/1995 | WIPO . | |

OTHER PUBLICATIONS

Chemical Abstracts, vol. 110, No. 11, 29 May 1989, Columbus, Ohio U.S.A. Abstract No. 198189z, W.F. Chang et al. "Stabilization of Phosphogypsum With Epoxy" p. 344; see abstract & Proceedings Of The International Conference on Phosphogypsum No. 2, 1988, China pp. 287–300 XP57029 no month.

Chemical Abstracts, vol. 101, No. 12, 17 Sep. 1984, Columbus, Ohio, US; abstract No. 96679f, "Foamed Gypsum Boards" p. 345; see abstract & JP,A,5954 658 (AIN Engineering KK) 29 Mar. 1984.

Database WPI Week 8716, Derwent Publications Ltd., London, GB; AN 87–112152 & JP,A,62 057 456 (Showa) see abstract & Patent Abstracts of Japan, vol. II, No. 251 (C–440) 14 Aug. 1987 & JP,A.62 057 456 (Showa) 13 Mar. 1987 see abstract.

*Primary Examiner*—Melissa Bonner
*Attorney, Agent, or Firm*—Kilpatrick Stockton LLP; Michael D. Bednarek

[57] ABSTRACT

This invention relates to a process for preparing ceramic-like materials with specific properties by binding an inorganic filler in the form of a dry composition with a grain size of up to 25 μm containing in the volume ratio 1:0.–1.52 a waste phosphogypsum and magnetite or glass-forming oxides, with an unsaturated polyester resin in an amount of 46–220 volume parts per 100 volume parts of the filler. The use of magnetite makes it poisible to prepare materials with magnetic properties, while glass-foming oxides enable preparing materials effective to absorb an X-radiation of 45–55 keV and a hard radiation of 0.6–125 MeV. When an expanding agent is added to the raw composition according to this invention, an expanded material is obtained, having completely closed pores, particularly useful in the building industry. The resultant ceramic-like materials are characterized by good adhesion to metals, plastics, glass, wood, concrete and can be easily joined with them both at the stage of polymerization and after its termination by using a prepolymerized resin as a binder.

33 Claims, No Drawings

PROCESS FOR PREPARING CERAMIC-LIKE MATERIALS AND THE CERAMIC-LIKE MATERIALS

The present invention relates to a process for preparing ceramic-like materials and the ceramic-like materials produced thereby. Such materials are suitable for manufacturing articles with magnetic properties products which absorb hard and x-radiations, and goods with insulating properties useful particularly in the building industry due to their very low moisture absorbability.

There are known various processes of binding inorganic fillers, including phosphogypsum, with synthetic polymers in aqueous systems, as is shown in Polish patent specifications 113 573 and 147 599, to prepare compositions to be used as flooring or raw materials for making stuccoes. The drawback of these processes is that the resultant products are rather brittle and porous and therefore possess a high water imbibition. On the other hand, the polymerization process involved proceeds rather slowly, which exclude the use of extrusion or injection moulding methods. There is also known from Polish application no. P. 283 240 a process for manufacturing ceramic-like plastics by binding a waste phosphogypsum with polyester resin in non-aqueous systems containing an accelerant, a curing agent and, in case of need, acetone. The resultant material is suitable for processing into various articles by extrusion or injection moulding and is characterized by good mechanical strength as well as low water and oil absorbabilities.

It has unexpectedly turned out that the use of a composite inorganic filler consisting of a waste phosphogypsum, especially apatite derived phosphogypsum, and other inorganic compounds such as metal oxides or salts, in the form of physically homogenized composition with a grain size not exceeding 25 μm, and binding this filler with unsaturated polyester resins in a non-aqueous system, makes it possible to prepare ceramic-like materials with specific properties, which can be easily moulded, also by casting, and machine processed. It has also turned out that by adding a $CO_2$ producing substance to the composition of waste phosphogypsum and an unsaturated polyester resin, one can prepare an expanded ceramic-like material.

The process for preparing a ceramic-like materials with magnetic properties by binding an inorganic filler with a synthetic resin in a non-aqueous system, according to the present invention consists in carrying out the process in several stages. At the first stage, a physically homogenized dry composition with a grain size of up to 25 μm is prepared from waste phosphogypsum and magnetite in volume proportion 1:0.66–1.52. The phosphogypsum for this stage is previously heated for at least one hour at a temperature not lower than 177° C. Next, the prepared dry composition in an amount of 100 volume parts is added on continuous stirring for 0.2–4.8 hours to 50–240 volume parts of an unsaturated polyester resin containing up to 8% by volume of an accelerant, such as cobalt naphthenate, after which up to 23 volume parts of an organic dilutant, such as acetone or styrene, is added to maintain the composition viscosity at a level of not higher than 4230 mPa●s. If the polyester resin does not contain an accelerant itself, then such resin is used in the amount of 46–220 volume parts per 100 volume parts of dry composition, and an accelerant in an amount up to 8% by volume or, equivalently, of 4–20 volume parts is added. Then, 3–20 volume parts of a curing agent is added, preferably in the form of a solution with a concentration of 20–40 % by volume of cyclohexanone peroxide or benzoyl peroxide in dibutyl phthalate, to obtain, after the termination of the polymerization, a ceramic-like material with magnetic properties.

The ceramic-like material with magnetic properties, containing an inorganic filler, a synthetic resin according to the present invention, after curing per every 50 volume parts of phosphogypsum contains 33–76 volume parts of magnetite, 46–220 volume parts of an unsaturated polyester resin and up to 46 volume parts of acetone or styrene.

The process for preparing a ceramic-like material effective to absorb an X-radiation of 45–55 keV and a hard radiation of 0.6–1.25 MeV, by binding an inorganic filler with a synthetic resin in a non-aqueous system, according to the present invention consists in carrying out the process in several stages. At a first stage, a physically homogenized dry composition with a grain size up to 20 μm is prepared from phosphogypsum waste which results from the production of phosphoric acid obtained from phosphorites, in paricular apatite, and glass-forming oxides in a volume ratio of 1:0.76–1.42, respectively, consist mainly of 81 weight % of lead oxide, 11.5 weight % of silicon dioxide and 2.6 weight % of barium oxide. Next, the dry composition in an amount of 100 volume parts is added on continuous stirring of at least 10 minutes to 50–240 volume parts of an unsaturated polyester resin containing up to 8% by volume of accelerant such as cobalt naphthenate, after which up to 23 volumes parts of an organic dilutant, such as acetone or styrene, is added to maintain the raw composition viscosity at a level of not higher than 4230 mPa.s. If polyester resin does not contain an accelerant itself, then such resin is used in an amount of 46–220 volume parts per 100 volume parts of dry composition, and an accelerant in an amount up to 8% per volume or, equivalently, of 4–20 volume parts is added. Then 3–20 volume parts of a curing agent is added, preferably in the form of a solution with a concentration of 20–40 volume % of cyclohexanone peroxide or benzoyl peroxide in dibutyl phthalate, to obtain after the termination of the polymerization, a radiation absorbing ceramic-like material. A plate made from this material with a thickness of 25 mm is characterized by ability to absorb X-radiation of 45–55 keV similarly as a lead plate with a thickness of 1.1 mm as well as a hard radiation of 0.6–1.25 MeV similarly as a lead plate with a thickness of 6.5 mm.

The ceramic-like material absorbing X-radiation of 45–55 keV and hard radiation of 0.6–1.25 MeV, containing an inorganic filler, a synthetic resin, and being cured with a curing agent according to the present invention, after curing per every 50 volume parts of phosphogypsum contain 38–71 volume parts of glass-forming oxides, 46–220 volume parts of an unsaturated polyester resin and up to 23 volume parts of acetone or styrene, while the glass-forming oxides include 81% by weight of lead oxide, 11.5% by weight of silicon dioxide and 2.6% by weight of barium oxide.

The process for preparing an expanding ceramic-like material by adding an expanding agent to an inorganic filler bonded with a synthetic resin, according to the present invention consists in that to the raw composition obtained by binding 100 volume parts of a waste phosphogypsum, previously heated at a temperature of not lower than 172° C. for at least 1.3 hours, with 60–270 volume parts of an unsaturated polyester resin containing up to 8% by volume of an accelerant such as cobalt naphthenate and addition, if required, of an organic dilutant such as acetone or styrene in an amount of up to 12 volume parts to maintain the composition viscosity at a level not higher than 4050 mPa s, and after adding 3–25 volume parts of a curing agent, preferably in the form of solution with a concentration of 20–40% by volume of cyclohexanone peroxide or benzoyl peroxide in dibutyl phthalate, butyl isocyanante in an amount of up to 30% by volume per the raw composition and 0.05–0.25% by volume of water are introduced.

The process for preparing a ceramic-like materials according to the present invention makes it possible to utilize postproduction phosphogypsum which most often is a noxious waste for the natural environment, whereas the ceramic-like materials themselves, owing to their easy processability by injection moulding as well as by casting, and their good physico-chemical properties, can be used in many cases instead of metals or plastics. Due to their very good adhesion to metals, plastics, glass, wood, and concrete, the ceramic-like materials can be readily bonded to these materials both before and after curing, using the prepolymerized composition as a binding agent. Moreover, articles made from the ceramic-like materials according to this invention, after having been worn out in most cases can be reused as filers after their previous disintegration, and thereby utilized again.

The present invention is further described by the following examples without limiting the invention.

EXAMPLE I

To 0.5 $dm^3$ of an unsaturated polyester resin, 0.7 $dm^3$ of a dry composition with a grain size up to 16 μm is added on continuous stirring, the said composition consisting of 60% by volume of magnetite and 40% by volume of a waste phosphogypsum (apatite derived), previously heated for 2.1 hours at a temperature of 217° C., then 0,001 $dm^3$ of cobalt naphthenate, 0.165 $dm^3$ of styrene and 0.03 $dm^3$ of a 30% solution of benzoyl peroxide in dibutyl phthalate are added. The resultant composition is casted into prepared moulds in the shape of magnetic holders for bar soap.

EXAMPLE II

Proceeding as in example I and using a dry composition with a grain size up to 10 μm, containing 0.35 $dm^3$ of phosphogypsum waste and 0.35 $dm^3$ of a mixture of glass-forming oxides with bulk density of 4.04 $dm^3$, containing 1.15 $kg/dm^3$ of lead oxide, 0.16 $kg/dm^3$ and 0.037 $kg/dm^3$ of barium oxide and the obtained material is used for coating the cubes formed from ion exchangers used out in installation for the concentration of radioactive effluents.

EXAMPLE III

1 $dm^3$ of an unsaturated polyester resin is blended on continuous stirring with 1.4 $dm^3$ of a waste phosphogypsum with a grain size of up to 12 μm, previously heated at a temperature of 237° C. for 1.9 hours, 0.002 $dm^3$ of cobalt naphthenate, 0.33 $dm^3$ of acetone, 0.07 $dm^3$ of a 30% solution of cyclohexanone peroxide in dibutyl phthalate and 0.4 $dm^3$ of butyl isocyanate and 0.03 $dm^3$ of water. The resultant expanded composition in used to form profiles designed for the insulation of hulls of yachts and boats.

We claim:

1. A process for preparing a material with magnetic properties by binding an inorganic filler with a synthetic resin in a non-aqueous system comprising the steps of:
  preparing a physically homogenized dry composition with a grain size of up to 25 μm, said dry composition containing waste phosphogypsum and magnetite in a volume ratio of 1:0.66 to 1.52, respectively;
  blending said dry composition on continuous stirring for 0.2–4.8 hours with an unsaturated polyester resin in an amount corresponding to 46 to 220 volume parts per 100 volume part of said dry composition, and adding an accelerant in an amount of up to 8% by volume of said resin; and
  subsequent to said step of blending, adding a curing agent in an amount of 3 to 20 volume parts per 100 volume parts of said resin.

2. The process of claim 1 wherein said waste phosphogypsum is an apatite derived phosphogypsum.

3. The process of claim 1 wherein said waste phosphogypsum is previously heated for at least one hour at a temperature not lower than 177° C.

4. The process of claim 1 wherein said accelerant comprises cobalt naphthenate.

5. The process of claim 1 wherein subsequent to said step of blending and prior to said step of adding a curing agent, an organic dilutant is added in an amount sufficient to maintain raw composition viscosity at a level not higher than 4,230 mPa.s.

6. The process of claim 5 wherein subsequent to said step of blending and prior to said step of adding a curing agent, an organic dilutant is added in an amount of up to 23 volume parts per 150–340 volume parts of said raw composition.

7. The process of Claim 6 wherein said organic dilutant comprises one of the group consisting of styrene and acetone.

8. The process of claim 1 wherein said curing agent comprises a solution with a concentration of 20% to 40% by volume of cyclohexanone peroxide or benzol peroxide in dibutyl phthalate.

9. A material with magnetic properties containing an inorganic filler, a synthetic resin, and being cured with a curing agent, said material comprising:
  100 volume parts phosphogypsum;
  66 to 152 volume parts magnetite;
  92 to 440 volume parts unsaturated polyester resin; and
  up to 46 volume parts acetone or styrene.

10. A process for preparing a material which absorbs X-radiation of 45–55 kev and hard radiation of 0.6–1.25 MeV comprising the steps of:
  preparing a physically homogenized dry composition with a grain size of up to 20 μm, said dry composition containing waste phosphogypsum and glass-forming oxides in a volume ratio of 1:0.76 to 1.42, respectively, and said glass-forming oxides consisting mainly of 81% by weight of lead oxides, 11.5% by weight of silicon dioxides and 2.6% by weight of barium oxides;
  blending said dry composition with an unsaturated polyester resin in an amount corresponding to 46 to 220 volume parts per 100 volume parts of said dry composition, and adding an accelerant in an amount up to 8% by volume of said resin; and
  subsequent to said step of blending, adding a curing agent in an amount of 3 to 20 volume parts per 100 volume parts of said resin.

11. The process of claim 10 wherein said waste phosphogypsum is an apatite derived phosphogypsum.

12. The process of claim 10 wherein said waste phosphogypsum is previously heated for at least 1.2 hours at a temperature not lower than 177° C.

13. The process of claim 10 wherein said accelerant comprises cobalt naphthenate.

14. The process of claim 10 wherein subsequent to said step of blending and prior to said step of adding a curing agent, an organic dilutant is added in an amount sufficient to maintain raw composition viscosity at a level not higher than 4,230 mPa.s.

15. The process of claim 14 wherein subsequent to said step of blending and prior to said step of adding a curing agent, an organic dilutant is added in an amount of up to 23 volume parts per 150–340 volume parts of said raw composition.

16. The process of Claim 14 wherein said organic dilutant comprises one of the group consisting of styrene and acetone.

17. The process of claim 10 wherein said curing agent comprises a solution with a concentration of 20% to 40% by volume of cyclohexanone peroxide or benzol peroxide in dibutyl phthalate.

18. A material which effectively absorbs X-radiation of 45–55 keV and hard radiation of 0.6–1.25 MeV, and which contains an inorganic filler, a synthetic resin, and being cured with a curing agent, said material comprising:
   100 volume parts of phosphogypsum;
   76 to 142 volume parts of glass-forming oxides, wherein said glass-forming oxides consist of 81% by weight of lead oxides, 11.5% by weight of silicon dioxides and 2.6% by weight of barium oxides;
   92–440 volume parts of unsaturated polyester resin; and
   up to 46 volume parts of acetone or styrene.

19. A process for preparing an expanded material having closed pores comprising the steps of:
   binding waste phosphogypsum with an unsaturated polyester resin in amounts corresponding to a volume ration of 1:0.6 to 2.7, respectively, said resin containing an accelerant in an amount of up to 8% by volume of said resin;
   adding a curing agent in an amount of 3 to 25 volume parts per 100 volume parts of said resin to form a raw composition; and
   adding butyl isocyanate in amount of 30% by volume of the raw composition and water in amount 0.05% to 0.15% by volume of the raw composition.

20. The process of claim 19 wherein said waste phosphogypsum is an apatite derived phosphogypsum.

21. The process of claim 19 wherein said waste phosphogypsum is previously heated for at least 1.3 hours at a temperature not lower than 172° C.

22. The process of claim 19 wherein said accelerant comprises cobalt naphthenate.

23. The process of claim 19 wherein subsequent to said step of blending and prior to said step of adding a curing agent, an organic dilutant is added in an amount sufficient to maintain raw composition viscosity at a level not higher than 4,050 mPa.s.

24. The process of claim 23 wherein subsequent to said step of blending and prior to said step of adding a curing agent, an organic dilutant is added in an amount of up to 12 volume parts per 160–370 volume parts of raw composition.

25. The process of claim 24 wherein subsequent to said step of blending and prior to said step of adding a curing agent, an organic dilutant is added, said organic dilutant comprising one of the group consisting of styrene and acetone.

26. The process of claim 19 wherein said curing agent comprises a solution with a concentration of 20% to 40% by volume of cyclohexanone peroxide or benzol peroxide in dibutyl phthalate.

27. A process for utilizing phosphogypsum comprising:
   preparing a physically homogenized dry composition which includes waste phosphogypsum and inorganic compounds, wherein said inorganic compounds include one of the group of magnetite and glass-forming oxides, wherein said glass-forming oxides consist of 81% by weight of lead oxides, 11.5% by weight of silicon dioxides and 2.6% by weight of barium oxides, said dry composition having a grain size of up to 25 µm;
   blending said dry composition with an unsaturated polyester resin in an amount corresponding to 46 to 220 volume pars per 100 volume parts of said dry composition, and adding an accelerant in an amount up to 8% by volume of said resin;
   subsequent to said step of blending, adding a curing agent in an amount of 3 to 20 volume parts per 100 volume parts of said resin to form a raw composition;
   subsequent to said step of adding a curing agent, shaping the raw composition into an article, whereby the waste phosphogypsum is utilized to form a material which has low moisture absorbability.

28. The process according to claim 27 wherein the step of shaping comprises an injection molding process.

29. The process according to claim 28, further including the step of adding butyl isocyanate in an amount of 30% by volume of the raw composition and water in an amount of 0.05% to 0.15% by volume of the raw composition.

30. The process according to Claim 27 wherein said dry composition includes said waste phosphogypsum and magnetite in a volume ratio of 1:0.66 to 1.52; respectively.

31. The process according to Claim 27 wherein said dry composition includes said waste phosphogypsum and said glass-forming oxides in a volume ratio of 1:0.76 to 1.4 2, respectively.

32. The process according to claim 31 wherein the resulting material effectively absorbs X-radiation of 45 to 55 keV and hard radiation of 0.6 to 1.25 MeV.

33. The process of claim 27 wherein said waste phosphogypsum is an apatite derived phosphogypsum.

* * * * *